(12) United States Patent
Lammens et al.

(10) Patent No.: US 8,289,568 B1
(45) Date of Patent: Oct. 16, 2012

(54) PRINTING USING VARIABLE PIXEL-REPLICATION FACTORS

(75) Inventors: Johan Lammens, Sant Cugat Barcelona (ES); Michel Georges Encrenaz, Rubi (ES); Yvan Richard, Barcelona (ES); Jan Morovic, Colchester Essex (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 793 days.

(21) Appl. No.: 12/388,874

(22) Filed: Feb. 19, 2009

(51) Int. Cl.
*H04N 1/405* (2006.01)
(52) U.S. Cl. ........................................ 358/1.2; 358/451
(58) Field of Classification Search .................. 358/1.2, 358/3.11–3.12, 451, 528; 382/299–300
See application file for complete search history.

(56) References Cited

U.S. PATENT DOCUMENTS

| | | | |
|---|---|---|---|
| 5,440,407 A | 8/1995 | Overton | |
| 5,583,659 A | 12/1996 | Lee et al. | |
| 5,598,204 A | 1/1997 | Harrington | |
| 5,801,843 A | 9/1998 | Overton | |
| 6,075,926 A | 6/2000 | Atkins et al. | |
| 6,471,332 B1 | 10/2002 | Vilanova et al. | |
| 6,690,485 B1 | 2/2004 | Borrell et al. | |
| 6,832,009 B1 | 12/2004 | Shezaf et al. | |
| 6,882,449 B2 | 4/2005 | Kimmel et al. | |
| 7,084,991 B2 | 8/2006 | Miguel et al. | |
| 7,149,369 B2 | 12/2006 | Atkins | |

*Primary Examiner* — Thomas D Lee
*Assistant Examiner* — Stephen M Brinich (57) ABSTRACT

A method of printing using variable pixel replication factors involves generating from an input image a reference image and a plurality of half-tone source images generated at different resolutions of the input image and with post-halftoning pixel replication factors applied such that the half-tone source images are all the same size. A pixel-replication factor selector function is applied to each reference pixel of the reference image to determine a respective source image for that reference pixel. Thus, different reference pixels correspond to different pixel replication factors. A print-state image is assembled by applying to each print-state image pixel the print state of the corresponding source pixel in the corresponding source image. The print-state image is then printed to a print medium.

5 Claims, 7 Drawing Sheets

PRINTING USING VARIABLE PIXEL-REPLICATION FACTORS

BACKGROUND

Digital images are typically defined by a two-dimensional array of picture elements (pixels). In a typical digital monochrome image, each pixel is assigned a one-dimensional gray-scale (lightness, brightness, intensity) value; in a typical digital color image, each pixel is assigned a three-dimensional color vector (e.g., in an RGB color space, each pixel is assigned three values, one for red, one for green, and one for blue). The values are typically integers, so shades and colors corresponding to non-integer values are represented by (clipped to) the nearest integer value. However, the color-resolution limits of human perception are such that assigning eight bit values per color per pixel can yield images that are difficult to distinguish from continuous tone. For this reason, 8-bit-per-color-per-pixel images are considered continuous-tone herein.

Printers employing discrete device state marking technologies, such as many inkjet, offset, dry electrophotograpy (e.g., "laser"), liquid electrophotography, often face a challenge in reproducing continuous-tone images. Many such printers have too few different color or shade of inks available to produce all shades or colors of a continuous-tone image, even when superimposing ink dots to yield combination colors. Some high-end ink-jet printers alleviate this problem by using more ink colors, e.g., 6-12 inks at a time instead of 3-4. This can be a costly solution and does not in and of itself achieve direct continuous-tone printing.

Accordingly, discrete-device-state printers take advantage of a tendency in human perception to spatially average high frequency visual stimuli, interspersing colors according to a half-tone technique to give the perception of intermediate colors that are not directly producible. Newspapers and other media have long interspersed black dots and white dots (absence of black ink on a white print medium) to give the impression of shades of gray. Likewise, discrete colors can be interspersed to give the perception of intermediate colors. Thus, half-toning (among other things) has helped discrete-device-state printers generate pleasing continuous-tone images using a limited color palette.

Herein, related art is described to facilitate understanding of the invention. Related art labeled "prior art" (if any) is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

In the course of the present invention, the following analysis was pursued. The efficacy of half-toning is limited by the tendency of inkjet drops to overlap. Ink drops are round, while the pixel areas they are supposed to fill are typically square; a round drop that fills a square pixel extends into adjacent pixel areas. Also, ink dots are rarely perfectly centered within a pixel; any misalignment can aggravate overlap into adjacent pixels. Moreover, adjacent ink dots can bleed into each other. If the dots are of different colors, as they often are in a half-toned image, their overlap results in combination colors. These combination colors, which are typically unwanted, can consume over 50% of a half-toned region.

To reduce the prevalence of unwanted combination colors, a continuous-tone image can be rendered at an integer fraction of the target printer linear resolution. The low-resolution image can then be half-toned. The half-toned image can then be expanded to full target print resolution using pixel replication. For example, replacing each pixel of a half-size half-tone image with a 2×2 array of pixels of the same color yields a half-toned print-resolution image.

The pixel-replicated half-toned image differs from the image half-toned at print resolution in that there is more clustering of pixels of the same color. Thus, more of the pixel overlap involves adjacent pixels of the same color and thus less area burdened with unwanted color combinations. The area consumed by unwanted color combinations can be further reduced by using still lower resolutions and higher pixel-replication factors. For example, a quarter (linearly) resolution image can be half-toned and then pixel replicated by replacing each pixel with a 4×4 array of the pixels of the same color. However, the use of larger pixel-replication factors (e.g., four instead of two) can increase the perceived graininess of the printed image. Thus, in the course of the present invention, it was recognized that selection of a pixel-replication factor involved a tradeoff between graininess and the prevalence of unwanted combination colors.

Further, tests and analyses conducted in the course of the invention indicated that the optimum pixel-replication factor in view of this tradeoff varies across images. In particular, the optimum pixel-replication factor varies as a function of local values of a lightness parameter and thus of lightness-related parameters such as brightness and luminance. Accordingly, the present invention provides for varying a pixel-replication factor across an image in accordance with local values for lightness or other lightness-related parameter.

Figure 1:
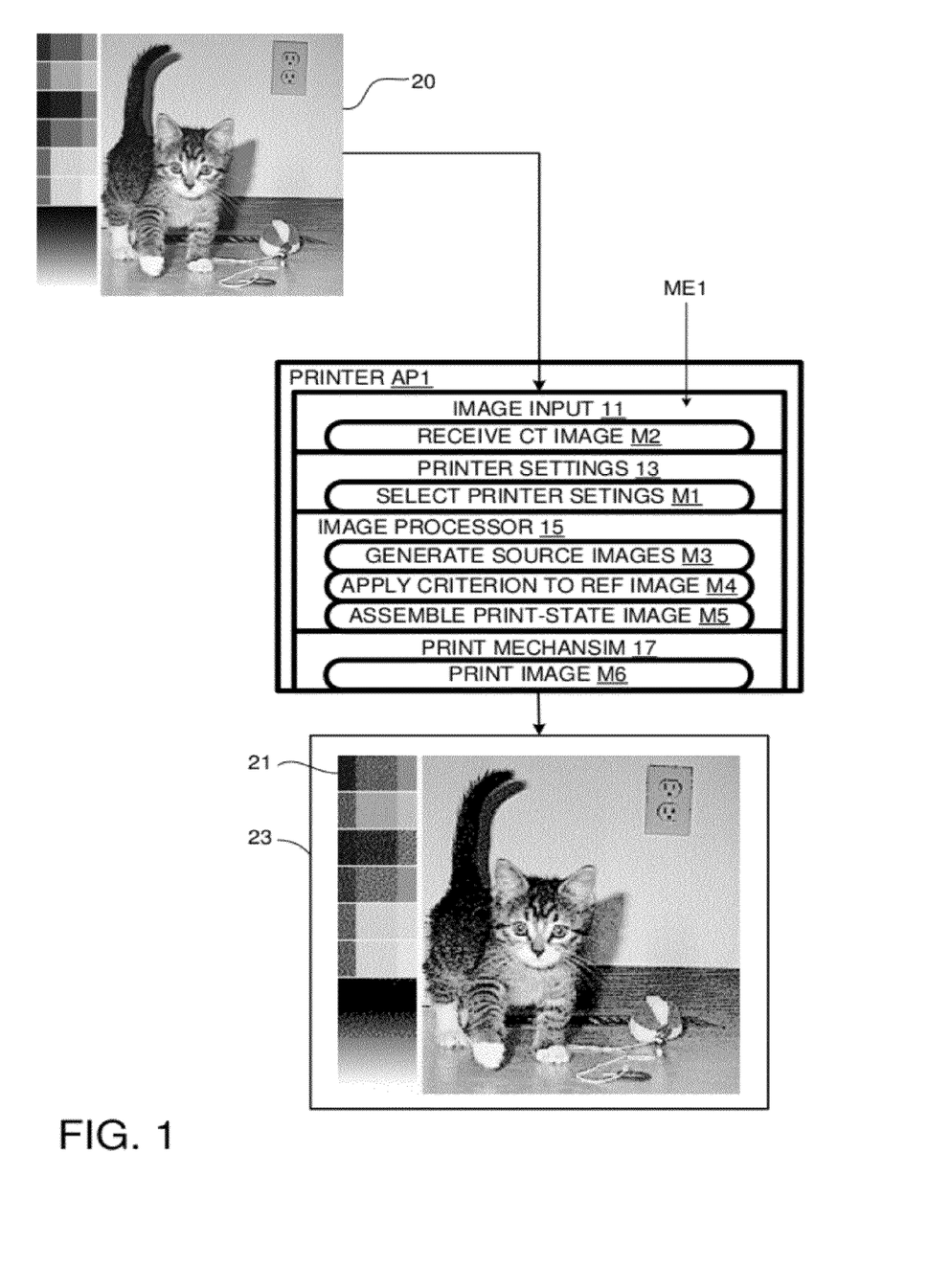
FIG. 1 is a schematic diagram of a printer in accordance with an embodiment of the invention.

A printer AP1 in accordance with an embodiment of the invention is shown schematically in FIG. 1. Printer AP1 includes an image input 11, non-volatile memory for storing printer settings 13, an image processor 15, and a printer mechanism 17. Image input 11 can be used to receive a continuous-tone digital image 20, e.g., from an attached computer or over an attached network. Digital image 20 is a continuous-tone color image represented as a continuous-tone monochrome image in FIG. 1.

Image processor 15 converts digital image 20 into a print-state image, which corresponds to a printed image 21 printed on print media 23 in accordance with a method ME1. Method segments M1-M5 of method ME1 are shown in relation to printer components 11-17 in FIG. 1, and are explained in greater detail with reference to FIG. 2.

Figure 2:
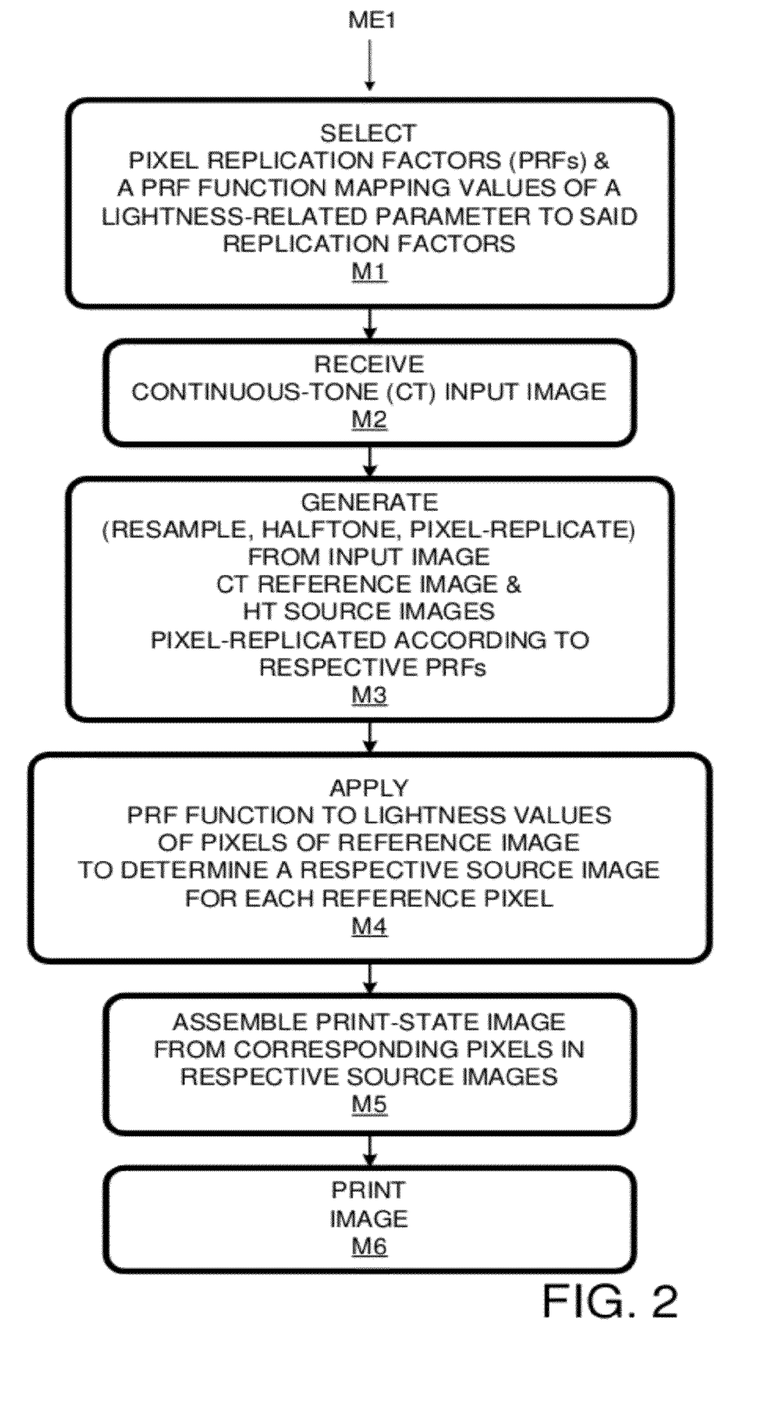
FIG. 2 is a flow chart of a method in accordance with an embodiment of the invention.

Method segment M1 involves selecting printer settings 13, including pixel replication factors (PRFs) and a PRF function mapping values of lightness or another lightness-related parameter (such as brightness or luminance) to the selected PRFs. Normally, the selected PRFs would constitute a series of powers of 2. The series 1, 2, 4, 8 can be used as a default, with the series 1, 2, 4 and the series 1, 2, 4, 16 as the most useful alternatives. Alternative embodiments permit non-power-of two PRFs, including 3, 5, 6, 7, etc.

Method segment M1 can also involve selecting a lightness related parameter. The default is lightness as defined in the standard hue-saturation and lightness (HSL) color space or L*A*B color space. Alternatively, brightness can be used as in the hue, saturation, and brightness (HSB) color model. Another choice is value as in the hue saturation and value (HSV) color model. Luminance as in the XYZ and xyY color spaces can also be used.

Once the lightness-related parameter is selected, its values are mapped to PRFs. Ranges are selected so that higher lightness values are to be mapped to lower PRFs. Other printer settings can involve whether text and business graphics are to be treated as part of a continuous-tone image or are to be treated separately.

Once the printer settings are selected, printer AP1 is ready to receive a continuous-tone image, e.g., image 20 of FIG. 1, at method segment M2. The received image can be 8-bit gray scale or 3*8-bit color, for example. In the case of a color input image, it can be converted to a color space corresponding to the printer inks and separated into color planes. The color planes can then be treated as independent gray-scale images. Alternatively, the input image can be converted to a Neugebauer color space, e.g., a 16-dimensional space including all possible superpositions of CYMK inks, again with each plane being treated as a monochromatic image. Since color images can be treated as multiple monochrome images, the following discussion focuses on the monochrome case.

At method segment M3, image processor 15 generates a reference image and source images. The reference image can be a continuous-tone version of the input image resampled as necessary to match the desired printer resolution. Each source image corresponds to a respective PRF, as explained with reference to FIG. 3.

Figure 3:
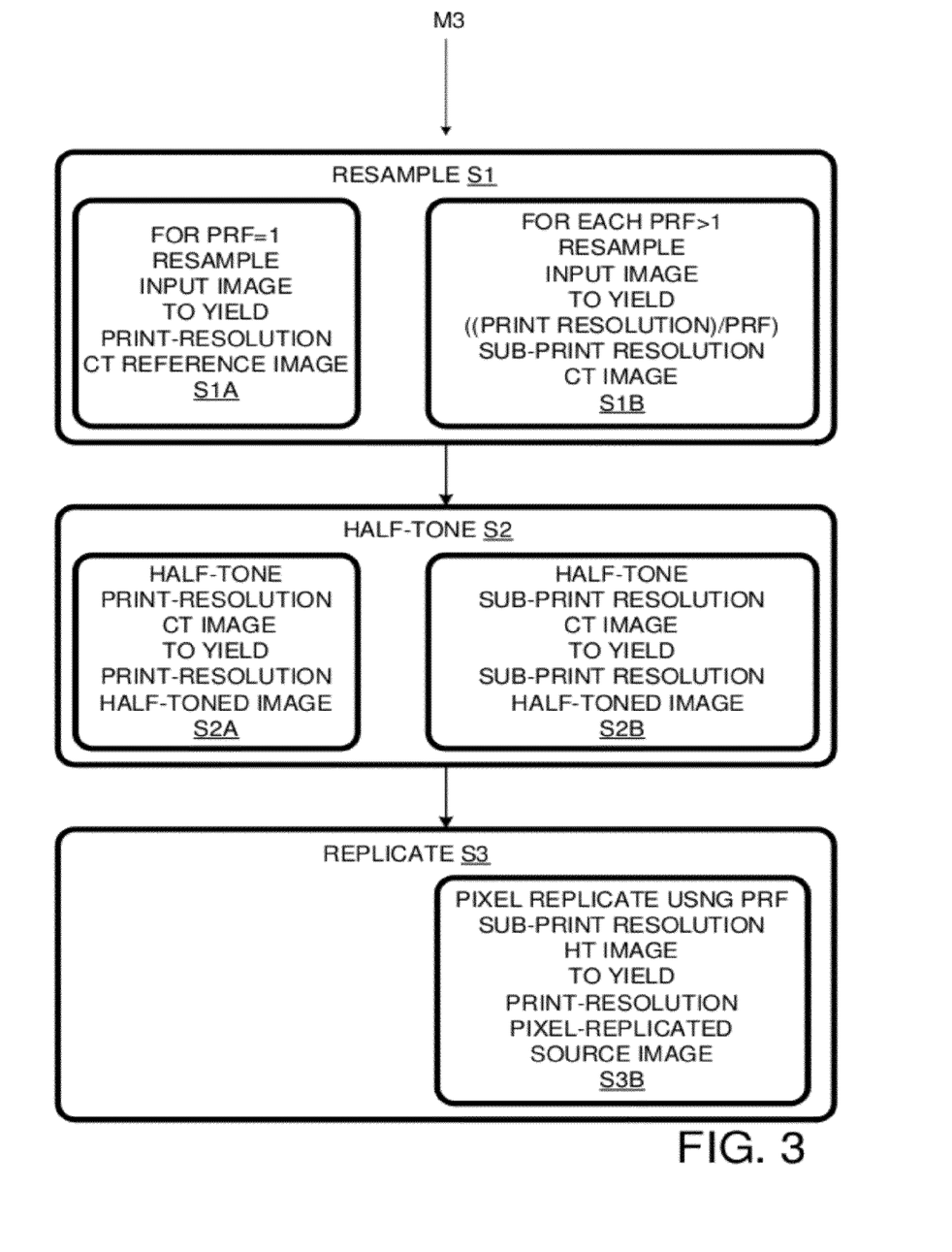
FIG. 3 is a flow chart showing steps of a method segment of the method of FIG. 2.

Method segment M3 involves three steps, resampling step S1, half-toning step S2, and pixel-replication step S3. At step S1, there is one resampling operation for each PRF, except that if the input image resolution matches one of the target resolutions, the input image can serve in lieu of generating a corresponding resampled image. Resampling step S1 includes step S1A for PRF=1 and step S1B for PRF>1.

Figure 4:
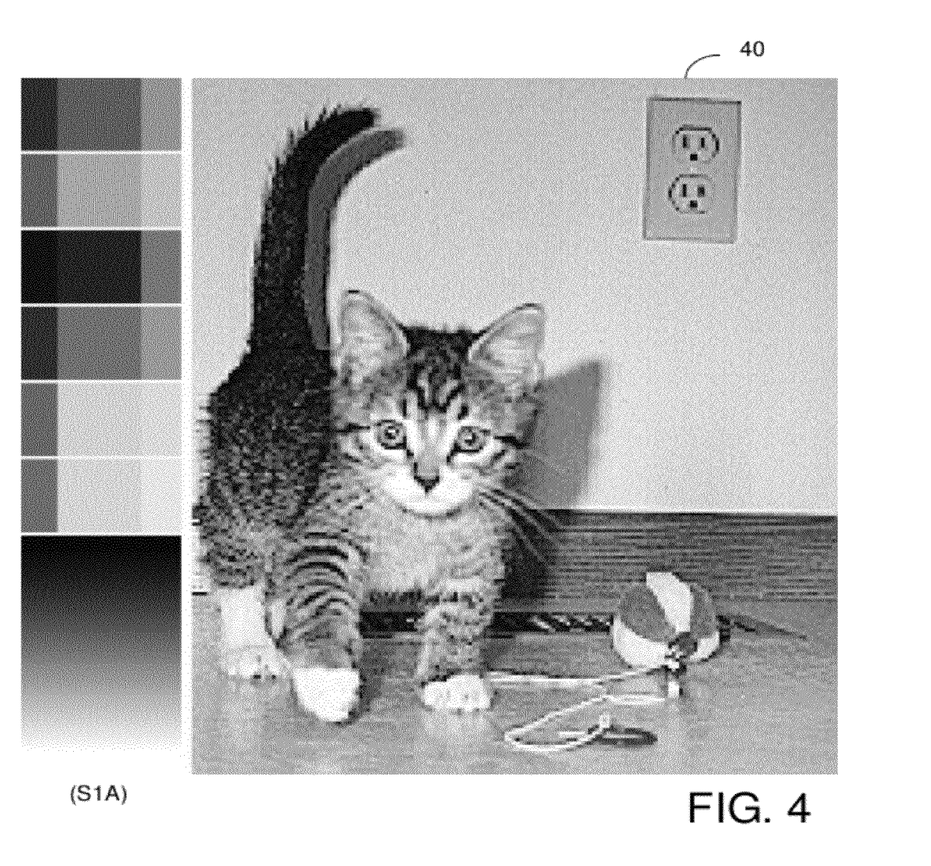
FIGS. 4-9 are gray-scale reproductions of color images that can be input or generated in the course of the method of FIG. 2.

At step S1A, for PRF=1, the input image is resampled as necessary to yield a resampled continuous-tone image matching the desired print resolution. for input image 20, the result is "reference" image 40, shown in FIG. 4.

Figure 5:
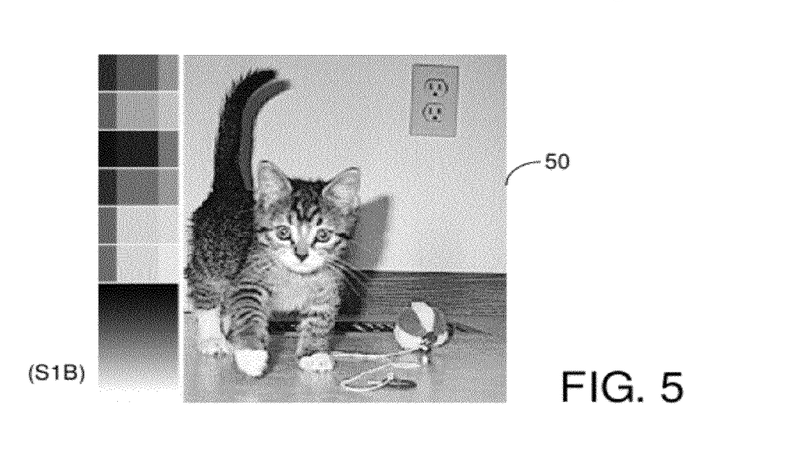

At step S1B, For PRF=2, the input image is resampled as necessary to yield an image with one half the target printer linear resolution (and, thus, one quarter the target printer area resolution); the result for input image 20 is resampled image 50, shown in FIG. 5. More generally, for PRF=i the resampling is to yield a resolution equal to 1/i times the target printer resolution. At the end of step S1, there is one resampled continuous-tone image for each selected PRF.

Figure 6:
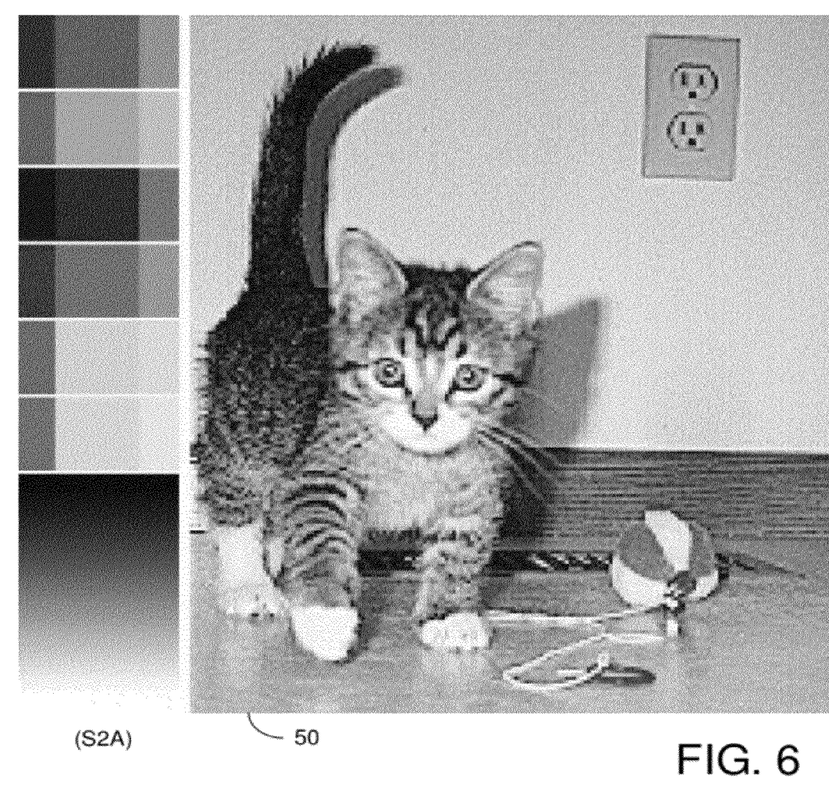

At step S2, half-toning is applied to each of the resampled images; step S2 includes step S2A for PRF=1 and step S2B for PRF>1. At step S2A, for PRF=1, reference image 40, FIG. 4, is half-toned to yield half-tone source image 60 of FIG. 6. Half-tone image 60 is at the desired print resolution. Half-toned source image 60 is the source image corresponding to PRF=1 as used in method segment M5, described further below. In the illustrated embodiment, the same half-tone algorithm, in this case, error diffusion propagated in a serpentine mode is applied to generate half-tone images for all PRFs. In this case, the input is 8-bits per pixel per color channel; the output is CMYK, 2 bits per pixel per channel. Alternative embodiments use other half-toning techniques.

Figure 7:
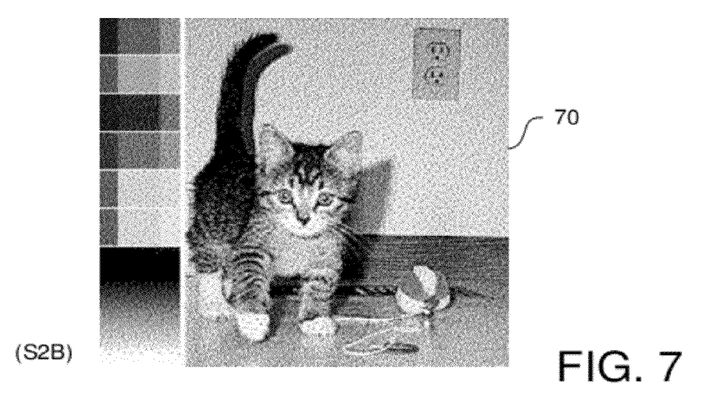

At step S2B, for PRF=2, half-resolution continuous-tone image 50 (FIG. 5) is half-toned to yield half-toned half-resolution image 70, shown in FIG. 7. More generally, for PRF=i, the result of step S2B is a half-toned version of input image 20 at a resolution that is 1/i times the target print linear resolution.

Figure 8:
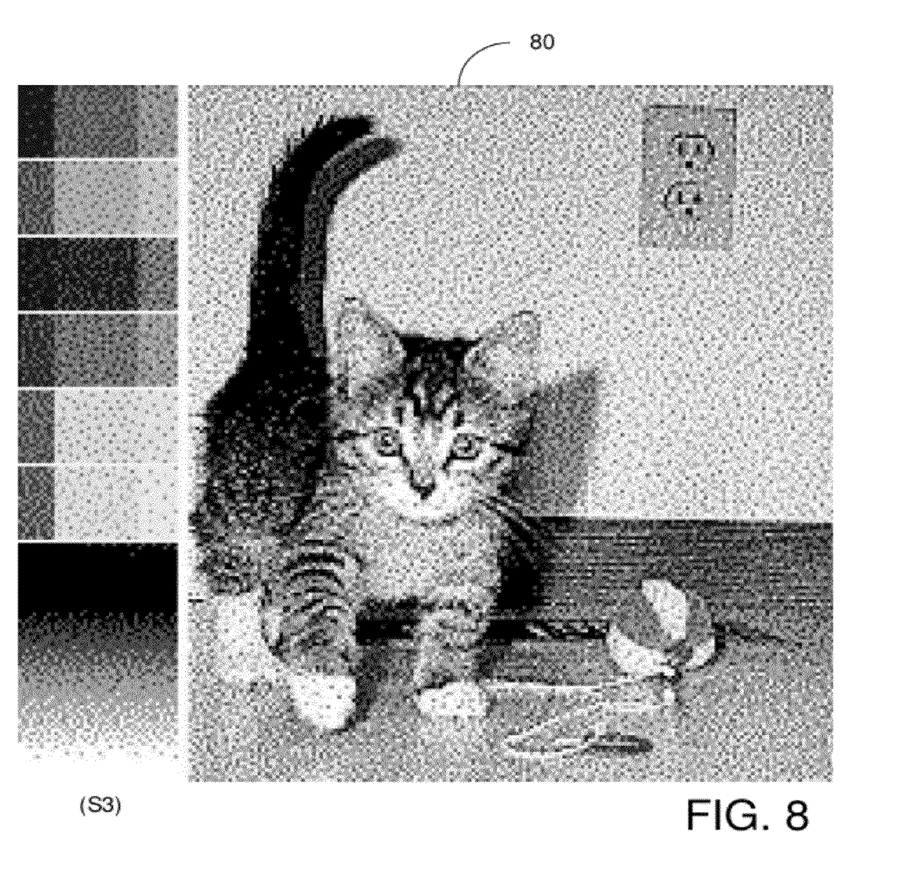

Step S3 provides a step S3B, but not a step S3A in that step S3 only applies where PRF>1 and not to where PRF=1. For PRF=2, step S3B involves applying a pixel-replication factor of PRF=2 to pixel-replicate half-toned, half-resolution image 70 to yield half-toned, full (target-print) resolution source image 80 of FIG. 8. Note that, as a result of the pixel replication, the half-toning of source image 80 is coarser (due to the included 2×2-pixel superpixels) than the half-toning of source image 60 for PRF=1. The coarser half-toning provides for a smaller area subject to unwanted combination colors, but increased graininess.

More generally, for PRF=i>1, step 3B provides for PRF=i pixel replication to yield a half-toned source image at the target print resolution. The greater the PRF, the coarser the half-toned source image due to the ixi superpixels. At the end of step S3B and thus method segment M3, there are as many source images as there are PRFs, with the source images associated with higher PRFs showing more graininess but less area subject to unwanted combination colors.

At method segment M4, FIG. 2, the PRF function (e.g., of local lightness values) is applied to continuous-tone full-print resolution reference image 40 to assign a PRF and thus the respective source image to each pixel of reference image 40. Thus, lighter pixels will be mapped to relatively fine-grained source images, while darker pixels with be mapped to source images that are relatively free of unwanted combination colors.

Method segment M5 involves "assembling" a print-state image at the target print resolution. Since the print-state image is to have the same (full target print) resolution as the reference image, their pixels can be mapped 1:1. Thus, for each pixel in the print-state image, there is a corresponding pixel in the reference image. Since each reference image pixel has been mapped to a PRF, each pixel in the print-state image can be mapped to the PRF of the corresponding reference pixel. Thus, each pixel in the print-state image has an associated PRF.

All source images have the full target print resolution. Therefore, for each combination of print-state pixel and source image, there is a corresponding pixel. In particular, for each print-state pixel, there is a respective source pixel in the source image corresponding to the PRF mapped to the print-state pixel. Each print-state pixel assumes the state of its respective source pixel. In general, print-state pixels will obtain their print states from different source images (according to the lightness of their corresponding reference pixel). Since each source image corresponds to a different replication factor, the assembled print-state image is characterized by a variable replication factor. For color applications in which a continuous tone image is represented by overlapping color planes, print-state pixels can have contributions from more than one color plane.

Figure 9:
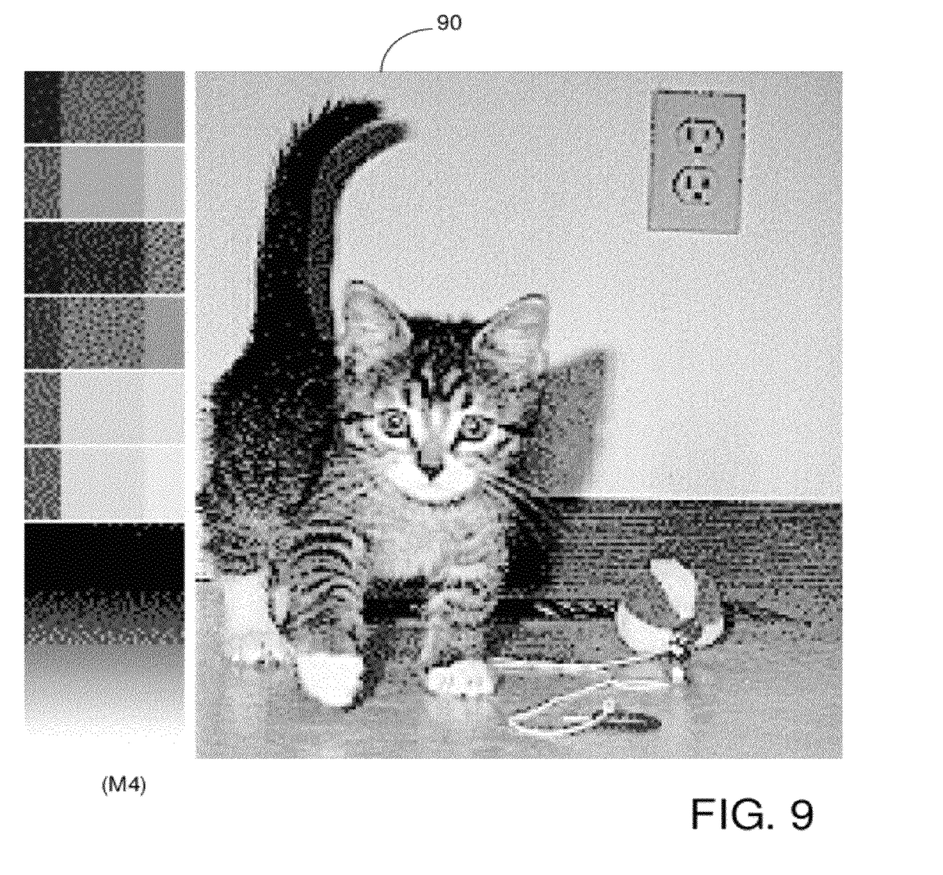

Such an assembled print-state image 90 is shown in FIG. 9. Note that in the large gradient rectangle at the bottom left of image 90, the half toning is coarser toward the darker areas. This variable coarseness also characterizes the rest of the image. Thus, unwanted color combinations are relatively suppressed in darker regions, while lighter regions (where unwanted color combinations tend to be less objectionable) benefit from greater spatial resolution. Note that aside from the coarse half-toning, image 90 is free of pixel-replication artifacts since the PRF varies on a per-pixel basis.

A widened color gamut is a surprising bonus benefit of the present invention, for certain ink and substrate combinations. Tests and analysis conducted in the course of the invention show that pixel replication enhances the color gamut for dark colors, but diminishes the color gamut for light colors. The present invention yields the wider color gamut at both ends of the lightness scale.

Alternative embodiments of the invention provide for different numbers of PRFs and PRFs that are not powers of two. Different sets of ink colors, including those with more than three or four colorants are provided for. Different color spaces are provided for, including those that treat each ink color separately and those that treat different color superpositions as different color planes. While the illustrated embodiment employs inkjet technology, other embodiments employ variable pixel replication in the context of other discrete-device-state marking technologies. Also, while lightness and lightness-related parameters values associated with individual pixels are used to determine pixel replication factors, other embodiments employ other color-related parameters (e.g., location within a CIELAB color gamut) and non-point (neighborhood) calculations to determine pixel replication factors. For example, the variable pixel replication can be used at red-yellow boundaries to minimize unwanted orange overlap areas; for another example, variable pixel replication can be used to at magenta-cyan boundaries to minimize dark blue unwanted dark blue areas. Other examples include local rate of change (image gradients), whether single channel or multi-channel, to determine pixel replication factors, or in general image properties determined by convolution operators. These and other variations upon and modifications to the illustrated embodiment are provided by the present invention, the scope of which is defined by the following claims.

What is claimed is:

1. A method of printing using variable pixel-replication factors, said method comprising:

generating from an input image a reference image and a plurality of half-tone source images, said half-tone source images being generated at different resolutions of the input image and with post-halftoning pixel replication factors applied such that the half-tone source images are all the same size;

applying a pixel-replication function to each reference pixel of said reference image to determine a respective half-tone source image for that reference pixel so that different reference pixels correspond to different ones of said replication factors;

assembling a print-state image, said assembling involving, for each reference pixel in said reference image, applying a pixel state of a corresponding source pixel of the respective half-tone source image for the reference pixel to a respective print pixel of said print-state image; and printing a print image using said print-state image.

2. A method as recited in claim 1 further comprising:

selecting said pixel-replication function so that reference pixels with relatively greater lightness are mapped to relatively lower pixel replication factors and so that reference pixels with relatively lower lightness are mapped to relatively higher pixel replication factors; and receiving said input image.

3. A method as recited in claim 2 wherein said input image and said reference image are continuous-tone images, said source images being half-tone images.

4. A method as recited in claim 2 wherein said selecting pixel replication factors involves selecting 1 and 2 as pixel replication factors.

5. A method as recited in claim 1 wherein said pixel-replication function is a function of a parameter selected from a set constituting lightness, brightness, and luminance.

* * * * *